United States Patent [19]
Hoffmeister

[11] 3,978,957
[45] Sept. 7, 1976

[54] HOLLOW GUIDING MAST FOR A CHARGING DEVICE OF A CORE REACTOR

[75] Inventor: Bernhard Hoffmeister, Wilhelmshaven, Germany

[73] Assignee: Fried. Krupp Gesellschaft mit beschrankter Haftung, Germany

[22] Filed: Oct. 10, 1974

[21] Appl. No.: 513,765

[30] Foreign Application Priority Data
Nov. 13, 1973 Germany............................ 2356503

[52] U.S. Cl..................................... 193/1; 176/30; 214/18 N
[51] Int. Cl.².................... G21C 19/20; B65G 11/16
[58] Field of Search................... 193/1, 2 R, 30, 38, 193/41, 35 R; 214/18 N, 141; 176/27–33; 212/55; 52/111, 114, 118, 632; 294/86 A

[56] References Cited
UNITED STATES PATENTS

| | | | |
|---|---|---|---|
| 1,319,943 | 10/1919 | Bessolo | 52/121 X |
| 3,421,635 | 1/1969 | Bunger | 176/30 X |
| 3,465,899 | 9/1969 | Rueter | 212/55 |
| 3,481,490 | 12/1969 | Eiler | 212/55 |
| 3,587,886 | 6/1971 | Gano | 212/55 X |
| 3,620,579 | 11/1971 | Brown | 212/55 X |
| 3,674,157 | 7/1972 | Fikse | 212/55 |

FOREIGN PATENTS OR APPLICATIONS

| | | | |
|---|---|---|---|
| 2,040,687 | 2/1971 | Germany | 212/55 |
| 1,009,373 | 5/1957 | Germany | 212/55 |

Primary Examiner—Evon C. Blunk
Assistant Examiner—James L. Rowland
Attorney, Agent, or Firm—Walter Becker

[57] ABSTRACT

A hollow tubular guiding mast made up of interconnected axial sections and adapted for reciprocably guiding the gripper or charging body for a core reactor. The mast includes reinforcing spars extending axially therein in the form of interconnected flat plates which diverge in the outward direction of the mast. Guide means, such as rollers, are adjustably mounted on the plates and engage angularly related regions of the body to be guided in the mast.

3 Claims, 7 Drawing Figures

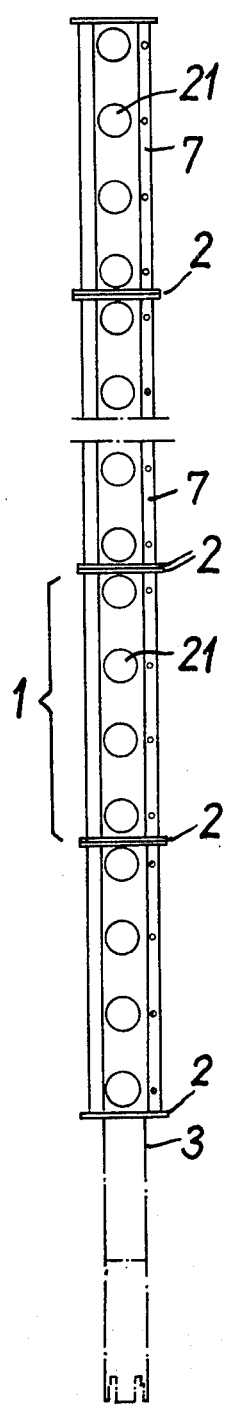
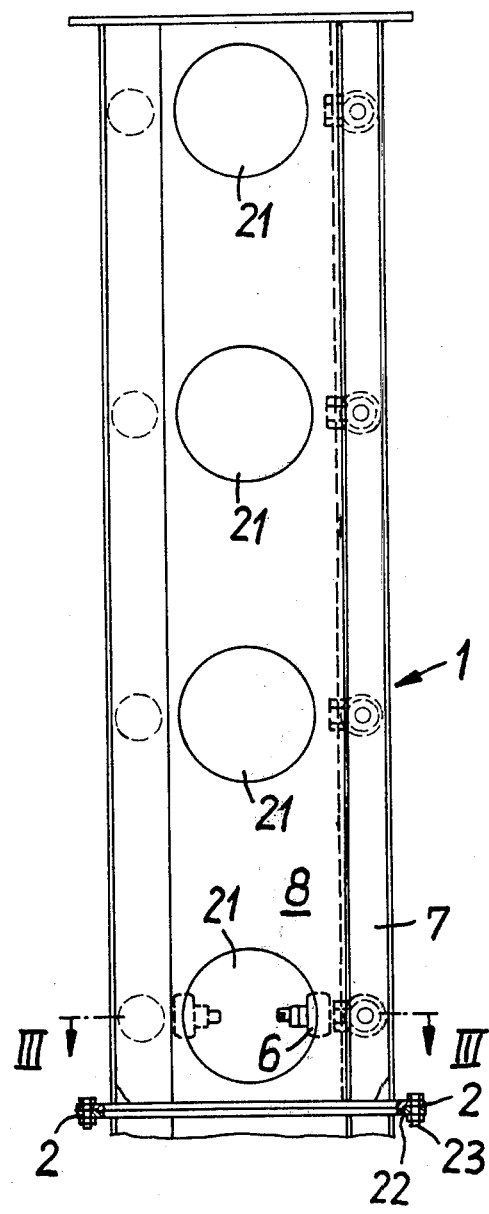

HOLLOW GUIDING MAST FOR A CHARGING DEVICE OF A CORE REACTOR

The guiding masts grippers of core reactor charging machines have heretofore been designed as grate constructions or as round tubular masts or posts. Designs of this type have the drawback that the guiding means for the grippers which guiding means are arranged within the interior of the guiding mast can be post-set only under difficulties by means of special tools. Therefore, a post-setting of the production means is frequently omitted. Furthermore, the design of such guiding masts in the form of grate constructions requires many parts and is expensive. As to the round pipe construction, the procurement of the pipes, which necessarily have to consist of special steel, with the respective required pipe diameters is rather difficult because the required pipe diameters frequently deviate from the listed diameters of the commercially available special steel pipes. Moreover, with round pipes, the introduction of the guiding means is possible only by means of expensive auxiliary constructions which additionally are not easily accessible and can hardly be controlled optically.

It is, therefore, an object of the present invention to provide guiding masts for grippers of core reactor charging devices which can be so designed that they can be economically manufactured and that the manufacturing means for the grippers can easily be post-adjusted and checked.

These and other objects and advantages of the invention will appear more clearly from the following specification in connection with the accompanying drawings, in which:

FIG. 1 illustrates a side view of a guiding mast according to the invention of a core reactor charging machine.

FIG. 2 is a side view of a section of the mast according to FIG. 1 but on a larger scale than the latter.

Figure 3:
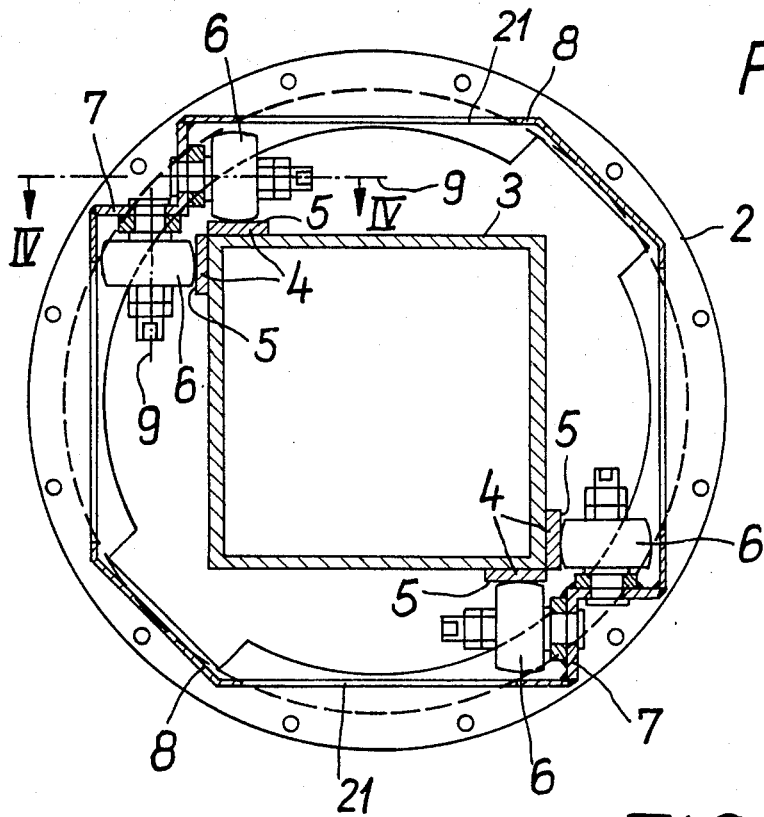
FIG. 3 represents a section taken along the line III—III of FIG. 2.
Figure 4:
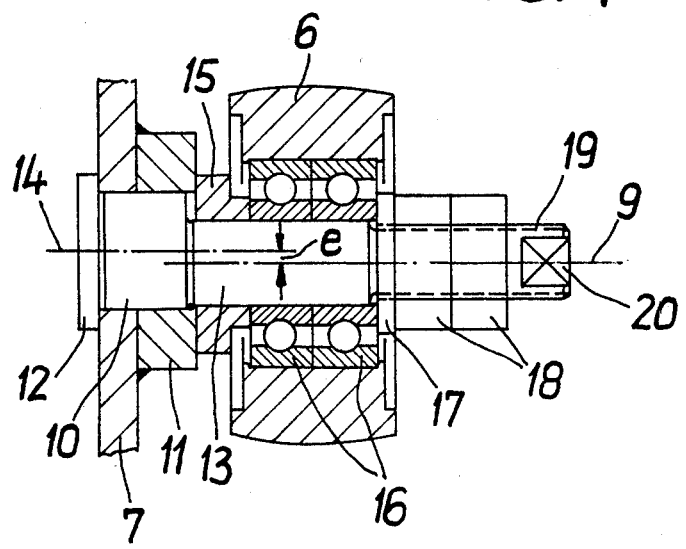
FIG. 4 is a section taken along the line IV—IV of FIG. 3 but on a scale larger than that of FIG. 3.

A guiding mast according to the invention differs from guiding masts of the heretofore known designs primarily in that the required high rigidity is realized in spite of the employment of relatively thin-walled sheet metal, by means of spars serving for guiding the grippers, said spars being adapted to be welded to the relatively short length of the individual sections onto the sheet metal. The manufacturing and welding tolerances may, due to the post-adjustability of the guiding means easily be maintained while the post-adjustment of the guiding means due to the good accessibility can easily be effected. The profile of the guiding mast may, without difficulties be adapted to the cross section of the grippers guided therein. Thus, the dependency common with round pipe constructions, from the listed pipe diameters will be obviated. The individual sections of the guiding mast may easily be exchanged in case of any damage thereof. The individual sections of the mast are expediently interconnected by flanges and are aligned relative to each other by circular centering edges. The required machining of the flange may, due to the short length of the mast sections and the corresponding relatively low weight easily be effected in one setting on a turning machine.

Referring now to the drawings in detail, the guiding mast is composed of a plurality of identical sections 1 which are interconnected by flanges 2. The upper end of the guiding mast is connected to the frame of a non-illustrated trolley of a charging machine. Within the guiding mast there is displaceably guided a fuel element gripper 3 which is displaceable in vertical direction. The fuel element gripper 3 has a rectangular, preferably square shaped cross section. The guiding of said gripper is effected at two diagonally oppositely located corners of the gripper profile. To this end, at both sides of the longitudinal edges of the gripper which form said corners are connected to said guiding bands 4 which have vertical prism surfaces.

The guiding bands 4 have their surfaces 5 in engagement with the guiding rollers 6 which are supported by angle steels 7. The profile of these angle steels is equal-sided and is open toward the outside. The two diagonally oppositely located angle steels 7 of each of the sections 1 are interconnected by sheet metal pieces 8 which are welded to the outer edges of said sections 1. In this way a mantle is formed which surrounds the gripper 3. The profile of this mantle is a square with sides located parallel to the lateral surfaces of the gripper 3. Two corners of this profile which are located opposite to each other are recessed by the angle steel 7. The two other corners of the square are replaced by the fact that the sheet metal pieces are beveled twice at an angle of 135°.

The guiding rollers 6 are in pairs so arranged on each of the two angle steels 7 in a vertically spaced manner that the axis of rotation 9 of the guiding rollers of each pair forming right angles with each other. Each guiding roller 6 is in a cantilever fashion journaled on a bolt which by means of one thick end 10 is fittingly inserted in bores which are located in a leg of the respective angle steel 7 and in a disc 11 welded to said leg. A flange or collar 12 engages the outside leg of the angle steel 7. The thick end 10 of the bolt continues in the form of a pivot 13 the center line of which coincides with the axis of rotation 9 of the guiding roller 6 an offset relative to the center line 14 of the thick end 10 by the extent e. Mounted on the pivot 13 is a spacer ring 15 which engages the inner side of disc 11. Following the spacer ring 15, two ball bearings 16 are slipped onto the pivot 13, the inner rings of which are clamped in between the spacer ring 15 and an annular disc 17 whereas their outer rings support the guiding rollers 6. The clamping in is effected by means of two nuts 18 which are mounted on a threaded pin 19 extending from said pivot 13. That end of the threaded pin 19 which extends beyond the nut 18 has flattened portions 20. The sheets 8 have circular windows 21 which are so arranged that guiding rollers 6, nuts 18 and flattened portions 20 are accessible therethrough.

The flanges 2 of two successive sections 1 are so turned off or machined that circular centering strips 22 are obtained. Consequently, the sections 1 when interconnected on flanges 2 by means of screws 23 are coaxially aligned relative to each other with the necessary precision.

By means of the guiding rollers 6, the gripper 3 is coaxially aligned with regard to the guiding mast 1 with the necessary precision. The operator is able to correct the alignment by post-setting the guiding rollers 6. After the nuts 18 have been loosened, it is possible by means of a wrench placed over the flat portions 20 so as to turn the bolts which carry the guiding rollers that, due to the eccentricity e, the guiding roller 6 is adjusted in the direction toward the center of the guiding mast or in opposite direction.

In the respective correct position in which the guiding roller engages the surface 5 of the pertaining guiding band 4, the bolt carrying the guiding roller is arrested. This is effected by guiding the nut 18 engaging the annular disc 17 so that the inner rings of the ball bearing 16 are tightened with the spacer ring 15 through the intervention of the collar 12 between the legs of the angle steel 7 and with the disc 11 and the annular disc 17. In this way, also the bolt is tightened so that its thick end 10 cannot turn within the bore of the leg and the disc 11. For safeguarding this tightening, subsequently the other nut 18 is tightened against the first mentioned nut.

Figure 5:
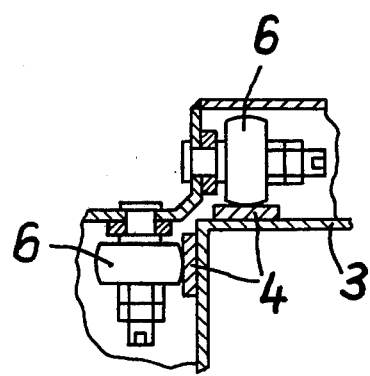
Figure 6:
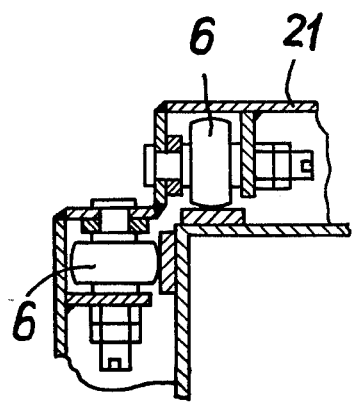

It is also within the scope of the present invention to employ spars with any other profile instead of the angle steels 7 provided that the wall of the section 1 will allow the required rigidity and will permit the proper mounting of the guiding rollers 6. Instead of the angle steels 7 purchased as semi-manufactured articles also for instance rectangular bevelled strong sheet metal pieces may be employed (FIG. 6). Instead of the angle profile, also a trapezoidal profile with outwardly directed openings may be employed (FIG. 5).

Figure 7:
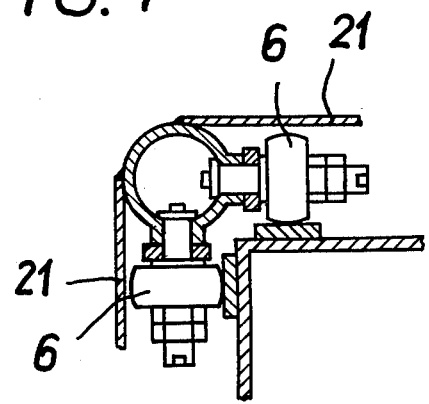

It is also possible to employ spars with a closed hollow profile (FIG. 7). Instead of mounting the guiding rollers in a cantilevered fashion, the bearing pivots of the guiding rollers may be journaled on both sides which means in addition to being mounted in the legs of the angle steels or the like may also be journaled in the opposite ends in ribs or fins provided in the interior of the wall (FIG. 6).

If the gripper does not have a rectangular profile, for instance in case of a triangular profile, and if the prism surfaces 5 form an angle different from 90°, it is, of course, necessary so to journal the guiding rollers that the axis of rotation of the rollers of each pair will confine therebetween a corresponding angle.

Instead of the guiding rollers 6, it may be expedient in some instances to connect sliding shoes on the spars.

It is, of course, to be understood, that the present invention is, by no means, limited to the specific showing in the drawings, but also comprises any modifications within the scope of the appended claims.

What is claimed is:

1. For a charging device of a core reactor apparatus for guiding a gripper body internally of a horizontal hollow mast consisting of sections placed against each other, each section consisting of a plate forming a mantle which is subdivided into two halves and only two horizontal spars inserted between these halves, each spar having two legs which converge toward the inside of the mast and guide means supported thereby inside the mast, the halves of the plate mantle being welded to the spars toward the inside of the mast, the gripper body having only two diagonally oppositely located pairs of horizontal guide surfaces, the guide surfaces of each pair converging in a direction toward one of the spars and engaging against the guide means supported thereby.

2. A device according to claim 1, which includes bores in said legs, bolts in said bores having eccentric pivot means toward the inside of the mast, rollers which form said guide means being journalled on said pivot means, and means for clamping said bolts in said plates in adjusted rotary positions.

3. A device according to claim 2, in which said rollers are journalled by means of anti-friction bearing means having inner race means on each pivot means, said means for clamping said bolts in adusted rotary positions comprising nuts on each bolt clamping the respective inner race means while simultaneously clamping the respective bolt against rotation in the said plate.

* * * * *

UNITED STATES PATENT OFFICE
CERTIFICATE OF CORRECTION

Patent No. 3,978,957   Dated September 7, 1976

Inventor(s) Bernhard Hoffmeister

It is certified that error appears in the above-identified patent and that said Letters Patent are hereby corrected as shown below:

On the Title Page Item 73, should read

-- [73] Fried. Krupp Gesellschaft mit beschrankter Haftung, Essen, Germany --.

Column 4, Claim 1, line 2, "horizontal" should read -- vertical --; line 6, "horizontal" should read -- vertical --; line 12, "horizontal" should read -- vertical --.

Signed and Sealed this

Sixteenth Day of November 1976

[SEAL]

Attest:

RUTH C. MASON
Attesting Officer

C. MARSHALL DANN
Commissioner of Patents and Trademarks